(12) United States Patent
Lee et al.

(10) Patent No.: US 11,944,868 B2
(45) Date of Patent: Apr. 2, 2024

(54) GOLF COACHING SYSTEM AND METHOD

(71) Applicant: VC INC., Seoul (KR)

(72) Inventors: Hakyong Lee, Yongin-si (KR); Sang Il Jin, Seoul (KR); Juno Kim, Seongnam-si (KR)

(73) Assignee: VC INC., Seoul (KR)

( * ) Notice: Subject to any disclaimer, the term of this patent is extended or adjusted under 35 U.S.C. 154(b) by 375 days.

(21) Appl. No.: 17/297,093

(22) PCT Filed: Dec. 20, 2019

(86) PCT No.: PCT/KR2019/018185
§ 371 (c)(1),
(2) Date: May 26, 2021

(87) PCT Pub. No.: WO2020/138857
PCT Pub. Date: Jul. 2, 2020

(65) Prior Publication Data
US 2022/0023716 A1    Jan. 27, 2022

(30) Foreign Application Priority Data

Dec. 28, 2018 (KR) .................. 10-2018-0172626
Dec. 20, 2019 (KR) .................. 10-2019-0171482

(51) Int. Cl.
*A63B 24/00* (2006.01)
*A63B 69/36* (2006.01)
*G06N 20/00* (2019.01)

(52) U.S. Cl.
CPC ...... *A63B 24/0003* (2013.01); *A63B 69/3605* (2020.08); *A63B 69/3623* (2013.01); *G06N 20/00* (2019.01); *A63B 2220/30* (2013.01); *A63B 2225/50* (2013.01)

(58) Field of Classification Search
CPC .................................................. A63B 24/0003
See application file for complete search history.

(56) References Cited

U.S. PATENT DOCUMENTS

2017/0106237 A1    4/2017  Dugan

FOREIGN PATENT DOCUMENTS

| KR | 10-2009-0077170 | 7/2009 |
| KR | 10-1509129 | 4/2015 |
| KR | 10-2015-0123965 | 11/2015 |
| WO | 2009-145463 | 12/2009 |

OTHER PUBLICATIONS

KIPO, PCT Search Report & Written Opinion of PCT/KR2019/018185 dated Apr. 6, 2020.

*Primary Examiner* — Kesha Frisby
(74) *Attorney, Agent, or Firm* — LEX IP MEISTER, PLLC

(57) ABSTRACT

A golf coaching system and a method thereof are disclosed. The golf coaching system may include: a swing measurement device that measures at least one of a swing trajectory and a posture change during a swing; a striking prediction device that predicts striking by measuring at least one of a ball speed, a swing speed, and a launch angle; and a data analysis server that generates coaching information based on data measured by the swing measurement device and the striking prediction device.

15 Claims, 11 Drawing Sheets

FIG. 2

| Swing Fault | Types of Caused Miss-hots | Coaching Message | How to measure |
|---|---|---|---|
| Over the Top (Swing overturn) | Slice, Hook, Shot pulled hard to the left (Pull shot) | At the beginning of the swing, try to swing with your hands down. You're playing a swinging overturn right now. | Measure whether the hand moves toward the ground (downward) or toward the ball compared to the head position at the beginning of the downswing by using ear and hand sensors. |
| Reverse Pivot (Failure to shift weight) | Loss of carry distance, Duff | Weight shift is not carried out. Try swinging while paying attention to weight shift with the feeling of swinging while stepping on | Head position excessively shifts to the right when swinging |
| (Failure to maintain spinal angle) | Slice, Hook, Duff, Topping | You are standing up at impact. Swing while paying attention to keeping the spine angle constant throughout the swing while fixing the head position. | Head excessively moves up at impact |
| Out in Swing | Slice, Hook | Out in swing is severe. Think of it as striking the ball at 1 o'clock and swing. | Distinguish In out swing and Out in swing by measuring the position change of the hand in 3D space |
| Chicken wing (Failure to release left hand) | Slice | The left hand is not released, so there is a high possibility of slicing. Swing while actively rotating your left hand. | Measures whether the left wrist rotates at impact |
| Casting | Loss of carry distance, Duff | Stop for a moment at the backswing top and swing with the feeling of swinging. You are using strength right from the top of the backswing and not able to put strength on the moment of impact. | Diagnosis of casting at the beginning of the downswing by measuring the acceleration according to the position of the hand during the swing |

FIG. 4

| # | Club | Swing Parameters | | | | Launch Monitor Parameter | | | | | | |
|---|---|---|---|---|---|---|---|---|---|---|---|---|
| | | Back Swing Time[Sec] | Down swing Time[Sec] | Swing Tempo | Swing Plane[%] | Ball Speed [m/s] | Club Head Speed[m/s] | Smash Factor | Launch Angle [Deg.] | Spin [rpm] | Apex Height [m] | Carry Distance[m] |
| 1 | Driver | 0.76 | 0.26 | 2.92 | 0.56 | 64.13 | 45.99 | 1.39 | 15.37 | 3650 | 33.97 | 218.34 |
| 2 | Driver | 0.81 | 0.25 | 3.24 | -2.97 | 65.35 | 45.81 | 1.43 | 18.63 | 3930 | 43.82 | 220.92 |
| 3 | Driver | 0.82 | 0.26 | 3.11 | -0.17 | 62.20 | 42.08 | 1.48 | 19.98 | 348 | 14.73 | 198.14 |
| 4 | Driver | 0.78 | 0.29 | 2.74 | 1.32 | 62.01 | 46.09 | 1.35 | 10.57 | 3370 | 20.13 | 204.53 |
| 5 | Driver | 0.75 | 0.25 | 3.00 | -1.33 | 66.20 | 44.54 | 1.49 | 15.07 | 3080 | 33.62 | 232.96 |
| 6 | Driver | 0.78 | 0.29 | 2.68 | 3.02 | 65.13 | 46.54 | 1.40 | 17.70 | 4000 | 41.98 | 218.93 |
| 7 | Driver | 0.78 | 0.25 | 3.11 | -0.74 | 65.21 | 43.77 | 1.49 | 19.80 | 3580 | 45.61 | 222.97 |
| 8 | Driver | 0.80 | 0.27 | 2.93 | 4.40 | 62.59 | 44.08 | 1.42 | 20.50 | 4090 | 44.71 | 207.52 |
| 9 | Driver | 0.78 | 0.25 | 3.09 | 3.20 | 65.11 | 48.45 | 1.34 | 15.02 | 4110 | 19.66 | 210.60 |
| 10 | Driver | 0.75 | 0.27 | 2.82 | -0.58 | 66.92 | 47.27 | 1.42 | 9.61 | 3280 | 21.89 | 226.22 |
| 11 | Driver | 0.76 | 0.26 | 2.93 | -0.51 | 65.28 | 44.36 | 1.47 | 16.70 | 3290 | 37.44 | 227.14 |
| 12 | Driver | 0.81 | 0.27 | 3.00 | 1.61 | 62.59 | 43.99 | 1.43 | 18.00 | 3580 | 38.43 | 214.08 |
| 13 | Driver | 0.77 | 0.28 | 2.81 | -2.31 | 66.11 | 44.37 | 1.49 | 18.87 | 3500 | 44.65 | 226.69 |
| 14 | Driver | 0.80 | 0.30 | 2.69 | -4.58 | 64.79 | 42.90 | 1.51 | 19.19 | 3290 | 42.84 | 223.88 |
| 15 | Driver | 0.75 | 0.29 | 2.62 | 1.51 | 65.37 | 44.26 | 1.48 | 14.08 | 2980 | 29.00 | 227.71 |
| 16 | Driver | 0.79 | 0.29 | 2.69 | -4.89 | 65.72 | 44.17 | 1.49 | 16.29 | 3160 | 36.21 | 230.44 |
| 17 | Driver | 0.79 | 0.27 | 2.96 | 2.04 | 61.91 | 44.36 | 1.40 | 16.48 | 3560 | 33.77 | 209.64 |
| 18 | Driver | 0.78 | 0.28 | 2.74 | 0.89 | 65.43 | 44.99 | 1.45 | 13.95 | 3150 | 30.18 | 227.61 |
| 19 | Driver | 0.75 | 0.29 | 2.58 | -3.56 | 63.01 | 43.17 | 1.46 | 15.74 | 3070 | 31.82 | 218.11 |
| 20 | Driver | 0.81 | 0.27 | 2.99 | 0.61 | 65.09 | 44.90 | 1.45 | 12.12 | 2990 | 24.03 | 223.13 |
| 21 | Driver | 0.75 | 0.25 | 3.00 | 4.27 | 63.78 | 43.08 | 1.48 | 15.10 | 2920 | 29.79 | 221.93 |

GOLF COACHING SYSTEM AND METHOD

TECHNICAL FIELD

The present disclosure relates to a golf coaching system and a method thereof.

BACKGROUND ART

With the popularization of golf, the golf population is rapidly increasing. In golf, balance and posture of the body, dispersion and timing of power, and the like have an important effect on improving performance. These factors are not acquired in a short period of time, but are acquired through continuous correction and training, and thus learning through constant practice at indoor screen golf courses and the like is a general method.

In order to improve golf skills, it is necessary to repeatedly practice golf swing optimized for each individual while looking at a direction and a distance of a struck ball for each individual practice shot and embody it as one's own.

Recently, with the help of IT technology, various devices for golf coaching, such as a swing analysis device and a striking ball analysis device, have been developed. However, conventional golf coaching devices only analyze golf swings or striking balls individually, but do not have the function of comprehensively analyzing golf swings and striking. In addition, conventional golf coaching devices are mainly used only during practice, and when a problem occurs in the golf swing during actual golf rounds, there is a problem that they cannot provide adequate coaching on which part is a problem.

DISCLOSURE

Technical Problem

A problem to be solved by the present disclosure is to provide a personalized golf coaching system capable of solving problems through appropriate coaching even when a problem occurs in the golf swing in connection with the golf swing and the batted ball, and even when a problem occurs in the golf swing during the actual golf rounding.

Technical Solution

A golf coaching system according to an embodiment of the present disclosure may include: a swing measurement device that measures at least one of a swing trajectory and a posture change during a swing; a striking prediction device that predicts striking by measuring at least one of a ball speed, a swing speed, and a launch angle; and a data analysis server that generates coaching information based on data measured by the swing measurement device and the striking prediction device.

In some embodiments of the present disclosure, the swing measurement device may provide the coaching information to a user.

In some embodiments of the present disclosure, the data analysis server may transmit the coaching information to the swing measurement device, and the swing measurement device may provide the coaching information received from the data analysis server to a user.

In some embodiments of the present disclosure, the golf coaching system may further include a gateway device that collects the data measured by the swing measurement device and the striking prediction device.

In some embodiments of the present disclosure, the gateway device may transmit the collected data to the data analysis server, and the data analysis server may generate the coaching information based on the collected data received from the gateway device.

In some embodiments of the present disclosure, the gateway device may generate the coaching information based on the collected data.

In some embodiments of the present disclosure, the gateway device may transmit the coaching information to the swing measurement device, and the swing measurement device may provide the coaching information received from the gateway device to the user.

In some embodiments of the present disclosure, the data analysis server may include a machine learning model training module that trains a machine learning model based on first data measured by the swing measurement device and second data performed and labeled by the striking prediction device.

In some embodiments of the present disclosure, the machine learning model may receive data on the swing trajectory or the posture change, and may output a predicted carry distance.

In some embodiments of the present disclosure, the coaching information may include information on the swing trajectory or the posture change corresponding to a predicted carry distance in a predetermined range.

A golf coaching system according to an embodiment of the present disclosure may include: a swing measurement device that measures at least one of a swing trajectory and a posture change during a swing; a striking prediction device that predicts striking by measuring at least one of a ball speed, a swing speed, and a launch angle; and a data analysis server that trains a machine learning model based on first data measured by the swing measurement device and second data performed and labeled by the striking prediction device, and generates coaching information by using the machine learning model.

In some embodiments of the present disclosure, the machine learning model may receive data on the swing trajectory or the posture change, and may output a predicted carry distance.

In some embodiments of the present disclosure, the coaching information may include information on the swing trajectory or the posture change corresponding to a predicted carry distance in a predetermined range.

In some embodiments of the present disclosure, the swing measurement device may provide the coaching information to a user.

In some embodiments of the present disclosure, the data analysis server may transmit the coaching information to the swing measurement device, and the swing measurement device may provide the coaching information received from the data analysis server to the user.

A golf coaching method according to an embodiment of the present disclosure may include: measuring at least one of a swing trajectory and a posture change during a swing; predicting striking by measuring at least one of a ball speed, a swing speed, and a launch angle; and generating coaching information based on measured data.

In some embodiments of the present disclosure, the golf coaching method may further include providing the coaching information to a user.

In some embodiments of the present disclosure, the golf coaching method may further include training a machine learning model based on first data measured with respect to the swing trajectory and the posture change during swing and second data performed and labeled with respect to at least one of the ball speed, the switching speed, and the launch angle.

In some embodiments of the present disclosure, the golf coaching method may further include receiving data on the swing trajectory and the posture change and outputting a predicted carry distance.

In some embodiments of the present disclosure, the coaching information may include information on the swing trajectory or the posture change corresponding to a predicted carry distance in a predetermined range.

Advantageous Effects

In the golf coaching system and method according to the example embodiment of the present disclosure, not only can coaching by comprehensively analyzing the golf swing and the struck ball, but also appropriate coaching for the golf swing during the actual golf round is possible.

DESCRIPTION OF THE DRAWINGS

FIG. 2 is provided for description of examples of coaching messages of the golf coaching system according to the embodiment of the present disclosure.

FIG. 4 and FIG. 5 are provided for description of one implementation example of the golf coaching system according to the embodiment of the present disclosure.

MODE FOR DISCLOSURE

Figure 1:
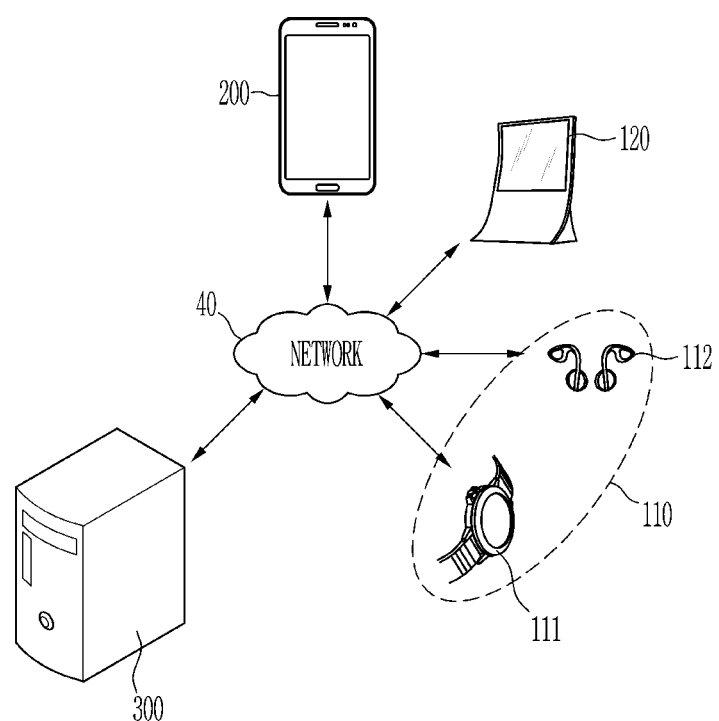
FIG. 1 is a schematic view provided for description of a golf coaching system according to an embodiment of the present disclosure

The present disclosure will be described more fully hereinafter with reference to the accompanying drawings, in which example embodiments of the disclosure are shown. As those skilled in the art would realize, the described embodiments may be modified in various different ways, all without departing from the spirit or scope of the present disclosure. Accordingly, the drawings and description are to be regarded as illustrative in nature and not restrictive. Like reference numerals designate like elements throughout the specification.

In addition, unless explicitly described to the contrary, the word "comprise", and variations such as "comprises" or "comprising" will be understood to imply the inclusion of stated elements but not the exclusion of any other elements. In addition, terms such as " . . . unit", " . . . unit", and "module" described in the specification mean a unit that processes at least one function or operation, and can be implemented as a combination of hardware or software or hardware and software.

FIG. 1 is a schematic view provided for description of a golf coaching system according to an embodiment of the present disclosure.

Unlike an existing golf coaching system that analyzes data of only one device, a golf coaching system according to an embodiment of the present disclosure collects data from a plurality of devices, and may treat posture change during swinging and a swing trajectory, and striking ball information corresponding to the result information of the posture change and the swing trajectory as a single data set. That is, data may be stored by matching a result event (striking) corresponding to a cause event (position change during swing, swing trajectory) at the same time point.

Referring to FIG. 1, the golf coaching system may include a swing measurement device 110, a striking prediction device 120, a gateway device 200, and a data analysis server 300. The swing measurement device 110, the striking prediction device 120, the gateway device 200, and the data analysis server 300 may exchange data through a network 40.

A swing trajectory measurement device 111, a swing posture measurement device 112, the striking prediction device 120, the gateway device 200, and the data analysis server 300 are computing devices that implement the entire or a part of a golf coaching method, which will be described hereinafter, and for example, can be implemented as a computing device including a smart phone, a smart watch, a smart band, a tablet computer, a laptop computer, a server, and the like, but the present disclosure is not limited thereto, and may be implemented as a computer device of any type such as a memory and a processor capable of storing and executing computer instructions.

The network 40 may include a wireless network including a cellular network, a Wi-Fi network, and a Bluetooth network, a wired network including a local area network (LAN), a wide local area network (WLAN), or a combination of a wireless network and a wired network. However, the range of the present disclosure is not limited thereto.

The swing measurement device 110 may measure at least one of a swing trajectory and a change in posture during a swing. The swing measurement device 110 may collect swing data from two or more devices, and in the present example embodiment, the swing measurement device 110 may include the swing trajectory measurement device 111 and the swing posture measurement device 112, but the present disclosure is not limited to such a configuration.

In addition, the swing measurement device 110 may provide coaching information generated based on measured data to a user (i.e., a golfer). Specifically, the swing measurement device 110 may provide coaching information to a user by displaying coaching information on a screen or outputting voice or sound through a speaker, operating vibration, displaying light, or using an arbitrary output function provided in the swing measurement device 110.

The swing trajectory measurement device 111 may measure a swing trajectory. Specifically, the swing trajectory measurement device 111 includes an acceleration sensor, a gyro sensor, and a geomagnetic sensor, and thus the swing trajectory measurement device 111 can estimate the swing trajectory using these sensors. In the present example embodiment, the swing trajectory measurement device 111 may be a wearable device such as a smart watch, but the present disclosure is not limited thereto.

The swing trajectory measurement device 111 can transmit data acquired using an acceleration sensor, a gyro sensor, a geomagnetic sensor, and the like to the gateway device 200 through the network 40. In addition, the swing trajectory measurement device 111 may receive coaching information generated based on data acquired from the gateway device 200 or the data analysis server 300, and may provide the received coaching information to the user.

Differently, the swing trajectory measurement device 111 may perform swing analysis on its own based on data acquired using an acceleration sensor, a gyro sensor, or a geomagnetic sensor. In this case, the swing trajectory measurement device 111 may provide coaching information generated as a result of its own analysis to the user.

The swing posture measurement device 112 may measure a change in posture during a swing. Specifically, the swing posture measurement device 112 includes an acceleration sensor, a gyro sensor, and a geomagnetic sensor, and thus the swing posture measurement device 112 can measure changes in golf swing posture, including head-up during a golf swing. In the present example embodiment, the swing posture measurement device 112 may be a wearable device manufactured in a form attached to a hat or an earphone form, but the present disclosure is not limited thereto.

The swing posture measurement device 112 may transmit data acquired using an acceleration sensor, a gyro sensor, a geomagnetic sensor, and the like to the gateway device 200 through the network 40. In addition, the swing posture measurement device 112 may receive coaching information generated based on data obtained from the gateway device 200 or the data analysis server 300, and provide the received coaching information to the user.

The striking prediction device 120 may predict striking by measuring at least one of a ball speed, a swing speed, and a launch angle, and transmit the predicted striking information to the gateway device 200 through the network 40.

The gateway device 200 may collect data measured by the swing measurement device 110 and the striking prediction device 120. Specifically, the gateway device 200 may interlock the data provided from the swing trajectory measurement device 111, the swing posture measurement device 112, and the striking prediction device 120, aggregate the posture change during the swing, the swing trajectory, the striking ball information corresponding to the result of the posture change and the swing trajectory into a set of data, and store or transmit the data set to the data analysis server 300 through the network 40. In the present example embodiment, the gateway device 200 may be a smart phone or an over-the-top (OTT) box, but the present disclosure is not limited thereto.

The gateway device 200 may transmit the collected data to the data analysis server 300, or may directly generate coaching information based on the collected data. When the gateway device 200 directly generates coaching information, the gateway device 200 may transmit the coaching information to the swing measurement device 110, that is, to the swing trajectory measurement device 111 or the swing posture measurement device 112, and the swing measurement device 110, that is, the swing trajectory measurement device 111 or the swing posture measurement device 112, may provide the coaching information received from the gateway device 200 to the user.

The data analysis server 300 may generate coaching information based on data measured by the swing measurement device 110 and the striking prediction device 120.

Specifically, the gateway device 200 transmits the collected data to the data analysis server 300, and the data analysis server 300 may generate coaching information based on the collected data received from the gateway device 200.

The data analysis server 300 may transmit the coaching information to the swing measurement device 110, that is, the swing trajectory measurement device 111 or the swing posture measurement device 112, and the swing measurement device 110, that is, the swing trajectory measurement device 111 or the swing posture measurement device 112, may provide the coaching information received from the data analysis server 300 to the user.

In the present example embodiment, the coaching information refers to information that can be helpful in improvement of golf skill of the user and generated by combining and analyzing causative events, that is, data on the swing trajectory and the posture change during the swing collected by the swing measurement device 110, and outcome events, that is, ball striking information collected by the striking prediction device 120. For example, the coaching information may include at least one among the results of analyzing the singularity of the swing when the striking is good and bad, whether the swing is different from the existing good swing trajectory, and whether the posture is different from the existing good posture, and then may be provided to the user.

The coaching information may be provided to the user not only at the golf driving range but also during the actual round. First, at a driving range where the striking prediction device 120 is installed, the user wears at least one of the swing trajectory measurement device 111 and the swing posture measurement device 112, and the data acquired using these devices is collected and analyzed to thereby provide the user with information on peculiarities of the swing when it is good and when it is bad as coaching information.

To this end, analysis of golf data may be performed in the following manner.

1. Data such as club speed, ball speed, launch angle, and smash factor are collected in the batting trajectory by club, date, and time.

2. The collected data can be classified into excellent data group and inferior data group for each club. In this case, when classifying an inferior data group, it is possible to classify inferiority by several factors (e.g., low launch angle, low club speed, and the like).

3. Excellent posture change/swing trajectory pattern is collected by extracting posture change corresponding to excellent trajectory data, and posture change when excellent trajectory data is generated by analyzing swing trajectory data/swing trajectory's characteristic pattern.

4. Posture change/swing trajectory characteristic patterns (e.g., center movement/head up, swing trajectory imbalance/swing tempo inadequate, etc.) are classified when inferior data occurs.

At a golf driving range where the actual round or striking prediction device 120 is not installed, while the user is wearing at least one of the swing trajectory measurement device 111 and the swing posture measurement device 112, at least one of whether the user is making a different swing compared to the existing good swing trajectory, and whether the user is in a different posture compared to the existing good posture can be provided to the user as coaching information.

For this, analysis of golf data may be performed in the following manner.

1. Measured data is received from the swing trajectory measurement device 111 and the swing posture measurement device 112 and compare and analyze excellent/inferior posture change/swing trajectory data.

2. When performing an inferior posture change/swing trajectory, coaching the user with a different part compared to the excellent posture change/swing trajectory induces excellent posture change/swing trajectory.

As described above, according to the golf coaching system of the present disclosure, it is possible to comprehensively analyze the golf swing by linking the struck ball and solve the problem through appropriate coaching even when a problem occurs in the golf swing during the actual golf round.

FIG. 2 is provided for description of examples of coaching messages of the golf coaching system according to the embodiment of the present disclosure. Referring to FIG. 2, coaching messages (coaching information) of the golf coaching system according to the embodiment of the present disclosure can be provided to the user depending on types of swing faults and miss shots that are caused.

For example, in case of "Reverse Pivot (weight shift failure)", the types of caused miss shots are distance loss and duff, and whether a swing fault occurs or not can be determined by measuring whether the head position moves excessively backwards when swinging. When such a swing fault occurs, the golf coaching system may provide coaching messages such as "The weight is not moving. Try swinging while paying attention to weight shift with the feeling of swinging while stepping on your left foot." to the user.

As previously described, the coaching message can be provided to the user through at least one of the swing trajectory measurement device 111 and the swing posture measurement device 112, and for example, the coaching message can be provided to the user by displaying the coaching message on a screen or outputting voice or sound through a speaker, operating vibration, displaying light, or using an arbitrary output function provided in at least one of the swing trajectory measurement device 111 and the swing posture measurement device 112.

Figure 3:
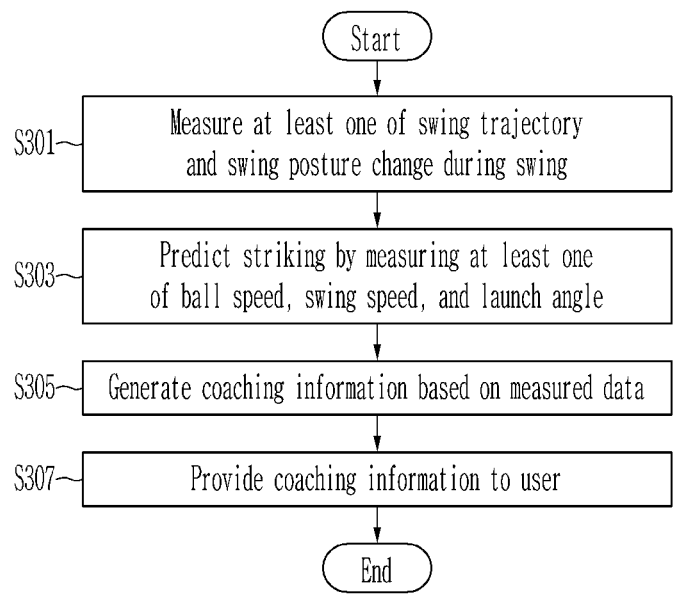
FIG. 3 is a flowchart provided for description of a golf coaching method according to an embodiment of the present disclosure.

FIG. 3 is a flowchart provided for description of a golf coaching method according to an embodiment of the present disclosure.

Referring to FIG. 3, a golf coaching method according to an embodiment of the present disclosure may include: measuring at least one of a swing trajectory and a swing posture change during a swing (S301); predicting striking by measuring at least one of a ball speed, a swing speed, and a launch angle (S303); generating coaching information based on measured data (S305); and providing the coaching information to a user (S307).

For more information on this, contents described in relation to FIG. 1 can be referred to, and therefore, duplicate descriptions will be omitted here.

Figure 5:
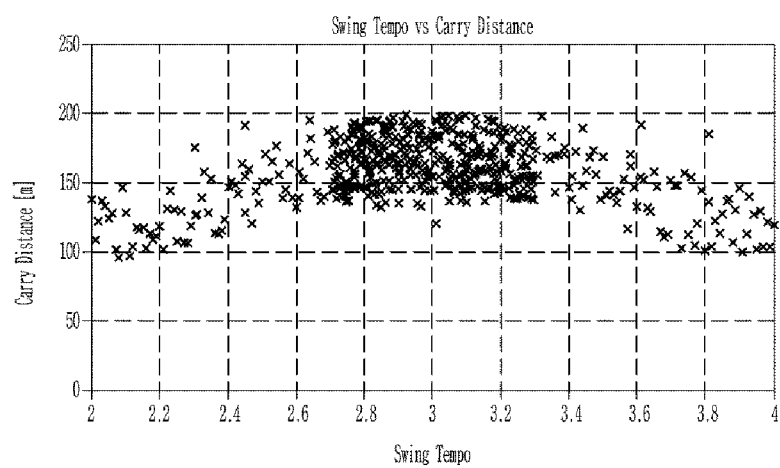

FIG. 4 and FIG. 5 are provided for description of one implementation example of the golf coaching system according to the embodiment of the present disclosure.

Referring to FIG. 4, data on swing parameters and launch monitor parameters can be acquired. Here, the swing parameter is a parameter that can be obtained by the swing measurement device 110, such as backswing time, downswing time, swing tempo, swing plane, and the like.

Meanwhile, the launch monitor parameter is a parameter that can be obtained by the striking prediction device 120, such as a ball speed, a club head speed, a smash factor, a launch angle, spin, an apex height, a carry distance, and the like. Here, the ball speed may represent the ball speed immediately after impact, and the club head speed may represent the club head speed just before impact. The smash factor is the ball speed divided by the club head speed, and the launch angle is the angle at which the ball rises from the ground. The spin represents the amount of spin right after impact, the apex height refers to the height of the highest point of the ball, and the carry distance refers to the distance to the landing point at which the ball flies into the air and lands. Among the swing parameters, the swing tempo is a value obtained by dividing the time from address to the top by the time it takes to descend from the top to the ball. That is, when the swing tempo is 3, for example, it takes 0.9 seconds from the address to the top and 0.3 takes to get to the ball again. That is, the ratio between the backswing and the downswing is 3:1. In FIG. 4, in the fifth row, it can be seen that the backswing time measured by the swing measurement device 110 is 0.75 seconds and the downswing time is 0.25 seconds, and accordingly, the swing tempo value is determined to be 3. In this case, referring to the striking information of the striking prediction device 120, the carry distance is 232.96 m, which shows a relatively good striking result.

However, for example, in the third row, it can be seen that the backswing time measured by the swing measurement device 110 is 0.82 seconds and the downswing time is 0.26 seconds, and accordingly, the swing tempo value is determined to be 3.11. In this case, referring to the struck ball information of the striking prediction device 120, the carry distance was 198.14 m, which shows a relatively poor striking result.

Subsequently, referring to FIG. 5, from data displayed on the graph, a correlation between the cause and the result, that is, the correlation of the carry distance according to the swing tempo, can be derived. The golf coaching system can combine and analyze the cause event, that is, the swing trajectory collected by the swing measurement device 110 and the data on the posture change during the swing, and the result event, that is, the struck information collected by the striking prediction device 120, and the singularity of the swing when the struck ball is good and when the struck ball is bad, that is, when the swing tempo is 3, the struck ball is good and the further the swing tempo is from 3, the better the struck ball will be derived.

In such a manner, the golf coaching system can select one or two or more good trajectories or excellent trajectories based on the cause event, that is, the swing trajectory collected by the swing measurement device 110 and the data on the posture change during the swing, and the result event, that is, the striking information collected by the striking prediction device 120, and data on the cause that showed good or excellent results, can be provided to the user in the form of coaching information. In addition, it is possible to select one or two or more bad trajectories or inferior trajectories, and provide data on the causes that showed bad trajectories or inferior trajectories to the user in the form of coaching information.

Based on this, the golf coaching system may provide coaching messages, for example, "The tempo of the actual swing has been increased from 3:1 to 2.8:1 compared to the tempo of an empty swing. Please swing more calmly on the next actual swing.", "The swing tempo from hole 1 to hole 9 is getting faster and faster from 3:1 to 2.5:1. At the beginning of the second half round, take a deep breath and refine your shot." A coaching message such as this can be provided to the user. to the user.

Figure 6:
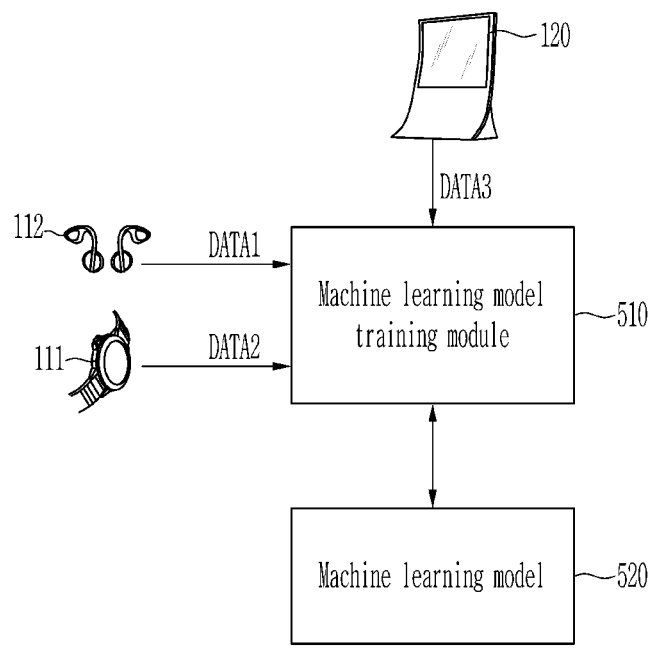
FIG. 6 to FIG. 8 are provided for description of a golf coaching system according to an embodiment of the present disclosure.
Figure 7:
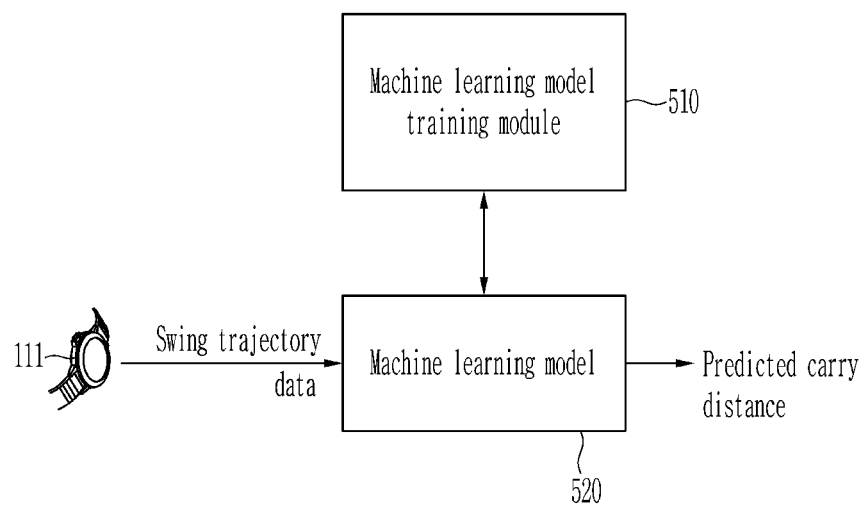
Figure 8:
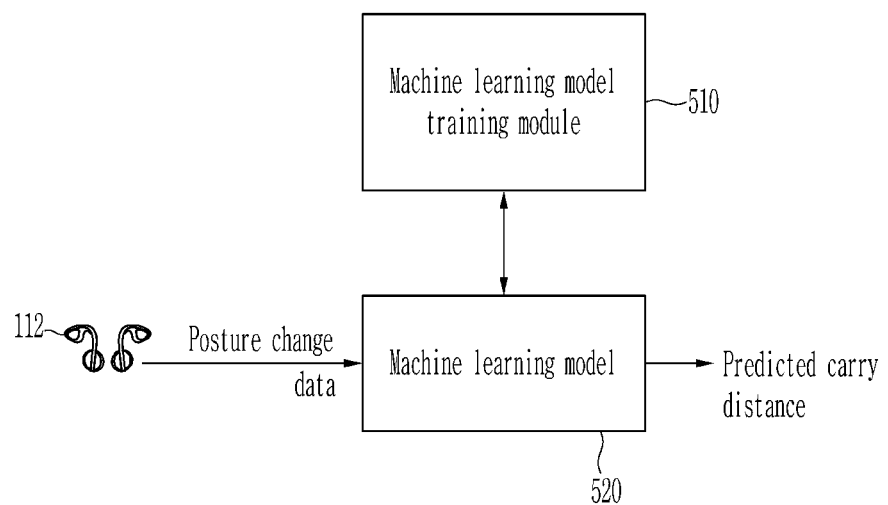

FIG. 6 to FIG. 8 are provided for description of a golf coaching system according to an embodiment of the present disclosure.

Referring to FIG. 6 to FIG. 8, a data analysis server 300 of a golf coaching system according to an embodiment of the present disclosure may include a machine learning model 520 and a machine learning model training module 510 that trains the machine learning model 530. When the gateway device 200 directly performs data analysis, the machine learning model 520 and the machine learning model training module 510 may be included in the gateway device 200.

The machine learning model training module 510 trains a machine learning model based on first data DATA1 and DATA2 measured by the swing measurement devices 111 and 112 and second data DATA2 predicted and labeled by the striking prediction device 120. The swing trajectory data (i.e., second data DATA2) of the swing trajectory measurement device 111 and the posture change data (i.e., first data DATA1) of the swing posture measurement device 112 are used as inputs, and striking ball information of the striking prediction device 120 is labeled to perform machine learning such that posture change/swing trajectory data matching each hitting result can be classified, and the posture change/swing trajectory from which an optimal result is derived can be predicted.

Furthermore, in actual rounding, the result can be predicted or user coaching can be made possible with only the current posture and swing trajectory without the striking prediction device 120. In this case, the machine learning model 520 may receive swing trajectory or posture change data (i.e., swing trajectory data of the swing trajectory measurement device 111 of FIG. 7 or posture change data of the swing posture measurement device 112 of FIG. 8) and output a predicted carry distance, and the coaching information may include information on the swing trajectory or the posture change corresponding to the predicted carry distance of a predetermined range.

In addition, statistical information such as an average value, a maximum value, a minimum value, and standard deviation of each club's carry distance can be provided by using statistics in practice situations using the striking prediction device 120, and for example, coaching messages such as "Remaining distance is 147 m, the customer's 7 iron practice data is average 145 m, standard deviation 5 m, aggressively recommends a 7 iron and conservatively a 6 iron." can be provided to the user.

Figure 9:
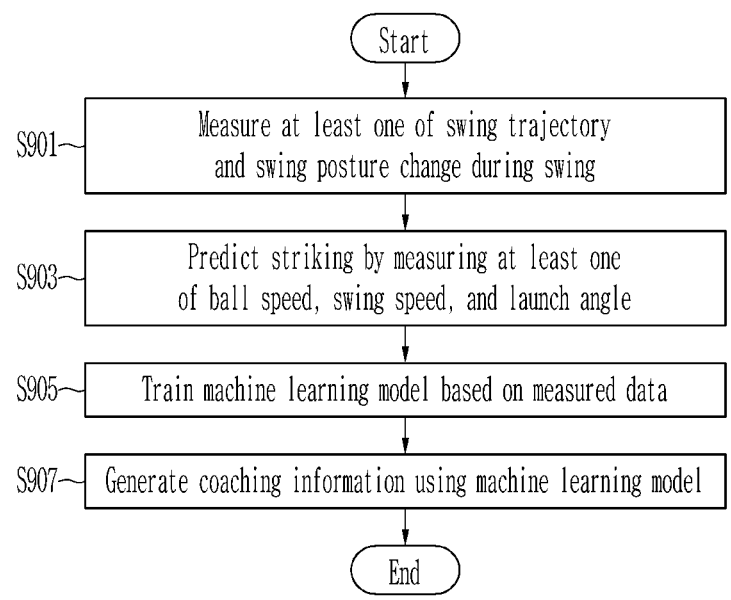
FIG. 9 is a flowchart provided for description of a golf coaching method according to an embodiment of the present disclosure.

FIG. 9 is a flowchart provided for description of a golf coaching method according to an embodiment of the present disclosure.

Referring to FIG. 9, a golf coaching method according to an embodiment of the present disclosure may include: measuring at least one of a swing trajectory and a posture change during a swing (S901); predicting striking by measuring at least one of a ball speed, a swing speed, and a launch angle (S903); training a machine learning model based on the measured data (905); and generating coaching information by using the machine learning model (S907).

For more information on this, contents described in relation to FIG. 1 and FIG. 6 to FIG. 8 can be referred to, and therefore duplicate descriptions will be omitted here.

Figure 10:
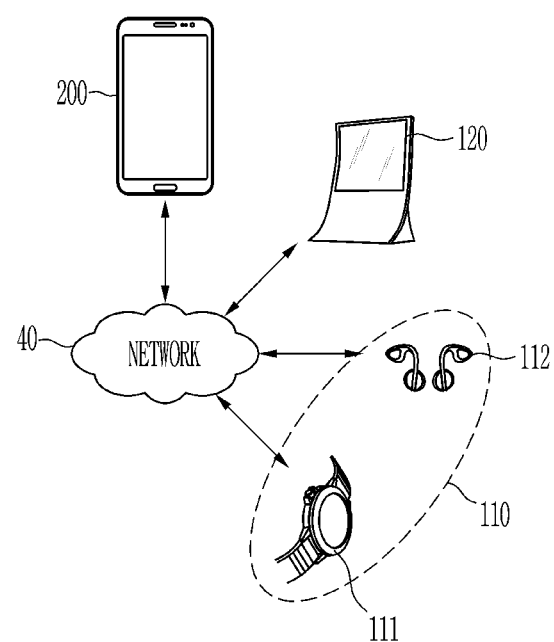
FIG. 10 is a schematic view provided for description of a golf coaching system according to an embodiment of the present disclosure.

FIG. 10 is a schematic view provided for description of a golf coaching system according to an embodiment of the present disclosure.

Referring to FIG. 10, a golf coaching system according to an embodiment of the present disclosure may include a swing measurement device 110, a striking prediction device 120, and a gateway device 200. The swing measurement device 110, the striking prediction device 120, and the gateway device 200 may exchange data through a network 40.

Unlike the embodiment of FIG. 1, the golf coaching system according to the present embodiment does not include a data analysis server 300.

Accordingly, the gateway device 200 may generate coaching information by directly analyzing data collected from the swing trajectory measurement device 111, the swing posture measurement device 112, and the striking prediction device 120, and provide the coaching information to the user. That is, in the present example embodiment, the gateway device 200 may be implemented to implement all the functions of the data analysis server 300 described above.

Figure 11:
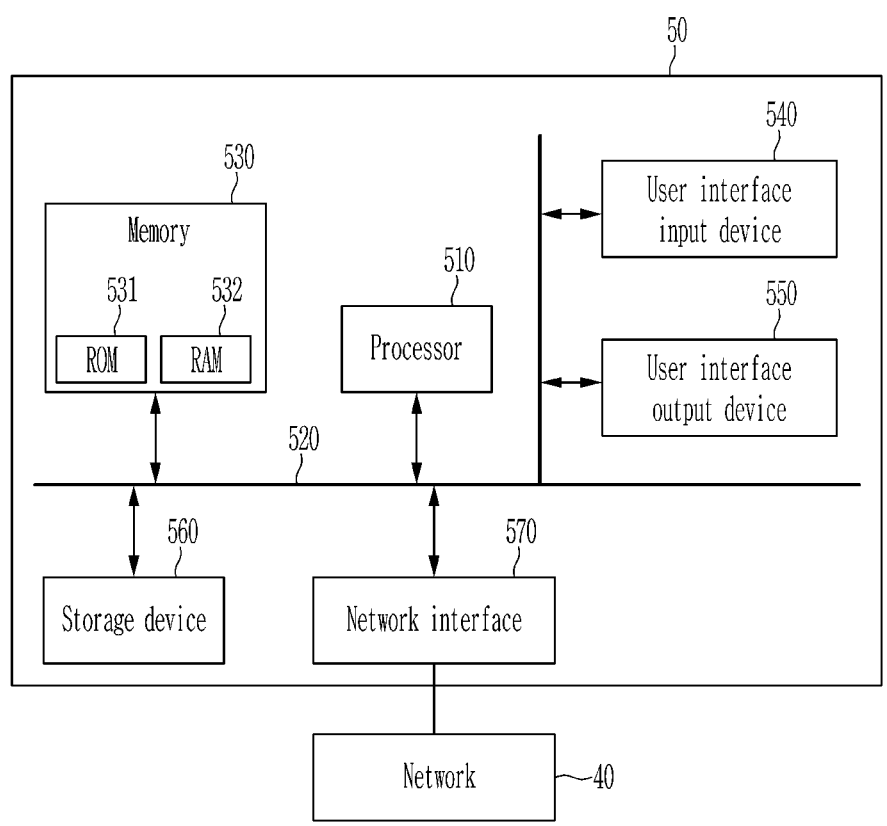
FIG. 11 is a block diagram provided for description of a computing device for implementing a golf coaching system and a method thereof according to an embodiment of the present disclosure.

FIG. 11 is a block diagram provided for description of a computing device for implementing a golf coaching system and a method thereof according to an embodiment of the present disclosure.

Referring to FIG. 11, a golf coaching system and a method thereof according to an embodiment of the present disclosure can be implemented by using a computing device 50.

The computing device 50 may include at least one of a processor 510, a memory 530, a user interface input device 540, a user interface output device 550, and a storage device 560 that communicate through a bus 520

The computing device 50 may also include a network 40, for example, a network interface 570 that is electrically connected to a wireless network. The network interface 570 may transmit or receive a signal to or from another object through the network 40.

The processor 510 may be an application processor (AP), a central processing unit (CPU), or a semiconductor device that executes instructions stored in the memory 530 or the storage device 560. The processor 510 may be formed to implement the functions and methods described with reference to FIG. 1 to FIG. 10.

The memory 530 and the storage device 560 may include various types of volatile or nonvolatile storage media. For example, the memory may include a read-only memory (ROM) 531 and a random access memory (RAM) 532. In the example embodiment of the present disclosure, the memory 530 may be disposed inside or outside the processor 510, and the memory 530 may be connected to the processor 510 through various known means.

In addition, at least some of the functions of the golf coaching system according to the example embodiment of the present disclosure may be implemented as a program or software executed on the computing device 50, and the program or software may be stored in a computer-readable medium.

In addition, at least some of the functions of the golf coaching system according to the example embodiment of the present disclosure may be implemented as hardware that can be electrically connected to the computing device 50.

According to the golf coaching system and method according to the present disclosure described hereinabove, not only can coaching by comprehensively analyzing the golf swing and the struck ball, but also appropriate coaching for the golf swing during the actual golf rounding, are possible.

While this disclosure has been described in connection with what is presently considered to be practical example embodiments, it is to be understood that the disclosure is not limited to the disclosed embodiments. On the contrary, it is intended to cover various modifications and equivalent arrangements included within the spirit and scope of the appended claims.

The invention claimed is:

1. A golf coaching system comprising:
    a swing measurement device that measures at least one of a swing trajectory and a posture change during a swing;
    a striking prediction device that predicts striking by measuring at least one of a ball speed, a swing speed, and a launch angle; and
    a data analysis server that generates coaching information based on data measured by the swing measurement device and the striking prediction device,
    wherein the generating coaching information comprising:
    collecting data measured by the swing measurement device and data measured by the striking prediction device into a set of data;
    deriving a correlation having the data measured by the swing measurement device as a cause, and the data measured by the striking prediction device as a result, from the set of data;
    selecting excellent or inferior data from the data measured by the striking prediction device; and
    generating the coaching information using data corresponding to the excellent or inferior data among the data measured by the swing measurement device.

2. The golf coaching system of claim 1, wherein
    the swing measurement device provides the coaching information to a user.

3. The golf coaching system of claim 2, wherein
    the data analysis server transmits the coaching information to the swing measurement device, and
    the swing measurement device provides the coaching information received from the data analysis server to a user.

4. The golf coaching system of claim 1, further comprising
    a gateway device that collects the data measured by the swing measurement device and the striking prediction device.

5. The golf coaching system of claim 4, wherein
    the gateway device transmits the collected data to the data analysis server, and
    the data analysis server generates the coaching information based on the collected data received from the gateway device.

6. The golf coaching system of claim 4, wherein
    the gateway device generates the coaching information based on the collected data.

7. The golf coaching system of claim 6, wherein
    the gateway device transmits the coaching information to the swing measurement device, and
    the swing measurement device provides the coaching information received from the gateway device to the user.

8. The golf coaching system of claim 1, wherein
    the data analysis server comprises a machine learning model training module that trains a machine learning model based on first data measured by the swing measurement device and second data performed and labeled by the striking prediction device.

9. The golf coaching system of claim 8, wherein
    the machine learning model receives data on the swing trajectory or the posture change, and outputs a predicted carry distance.

10. The golf coaching system of claim 9, wherein
    the coaching information comprises information on the swing trajectory or the posture change corresponding to a predicted carry distance in a predetermined range.

11. A golf coaching method comprising:
    measuring at least one of a swing trajectory and a posture change during a swing;
    predicting striking by measuring at least one of a ball speed, a swing speed, and a launch angle; and
    generating coaching information based on measured data,
    wherein the generating coaching information comprising:
    collecting data measured by the swing measurement device and data measured by the striking prediction device into a set of data;
    deriving a correlation having the data measured by the swing measurement device as a cause, and the data measured by the striking prediction device as a result, from the set of data;
    selecting excellent or inferior data from the data measured by the striking prediction device; and
    generating the coaching information using data corresponding to the excellent or inferior data among the data measured by the swing measurement device.

12. The golf coaching method of claim 11, further comprising
    providing the coaching information to a user.

13. The golf coaching method of claim 12, further comprising
    training a machine learning model based on first data measured with respect to the swing trajectory and the posture change during swing and second data performed and labeled with respect to at least one of the ball speed, the switching speed, and the launch angle.

14. The golf coaching method of claim 13, further comprising receiving data on the swing trajectory and the posture change and outputting a predicted carry distance.

15. The golf coaching method of claim 14, wherein
    the coaching information comprises information on the swing trajectory or the posture change corresponding to a predicted carry distance in a predetermined range.

* * * * *